United States Patent
Haacke et al.

(10) Patent No.: US 10,605,938 B2
(45) Date of Patent: Mar. 31, 2020

(54) 4D NOISE SUPPRESSION (71) Applicant: CGG Services SA, Massy (FR)

(72) Inventors: Ross Haacke, Massy (FR); Ivan Lim Chen Ning, Massy (FR); Henning Hoeber, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 612 days.

(21) Appl. No.: 14/914,564

(22) PCT Filed: Aug. 27, 2014

(86) PCT No.: PCT/EP2014/068123
§ 371 (c)(1),
(2) Date: Feb. 25, 2016

(87) PCT Pub. No.: WO2015/028485
PCT Pub. Date: Mar. 5, 2015

(65) Prior Publication Data
US 2016/0209533 A1    Jul. 21, 2016

Related U.S. Application Data (60) Provisional application No. 61/920,373, filed on Dec. 23, 2013, provisional application No. 61/870,492, filed on Aug. 27, 2013.

(51) Int. Cl.
G01V 1/30 (2006.01)
G01V 1/36 (2006.01)

(52) U.S. Cl.
CPC .............. *G01V 1/308* (2013.01); *G01V 1/362* (2013.01); *G01V 2210/32* (2013.01); *G01V 2210/6124* (2013.01)

(58) Field of Classification Search
None
See application file for complete search history.

(56) References Cited

U.S. PATENT DOCUMENTS 4,561,075 A * 12/1985 Smith ................. G01V 1/362
367/46
4,882,713 A * 11/1989 Hughes ............... G01V 1/362
367/47

(Continued)

FOREIGN PATENT DOCUMENTS

WO    2009/109663 A2    9/2009
WO    2013/101518 A1    7/2013
WO    2014/177633 A2    11/2014

OTHER PUBLICATIONS

Johnston, David H., "Practical applications of time-lapse seismic data," 2013 Distinguished Instructor Short Course, No. 16, Society of Exploration Geophysicists, Chapter 1.

(Continued)

*Primary Examiner* — Cory W Eskridge (57) ABSTRACT

The present disclosure includes a method for suppressing 4D noise. The method includes calculating a first similarity map based on the similarity of one of one or more first 3D images and a second 3D image. The first and second 3D images are derived from first and second surveys, respectively. The method also includes calculating a second similarity map based on the similarity of one of the one or more first 3D images and a third 3D image, which is derived from the second survey. The method also includes calculating a third similarity map based on the similarity of first and second 4D images, which are based on differences between the 3D images. The method also includes generating a composite 4D image based at least on the first, second, and third similarity maps. The present disclosure may also include associated systems and apparatus.

20 Claims, 6 Drawing Sheets

(56) References Cited

U.S. PATENT DOCUMENTS 6,041,018 A * 3/2000 Roche ............... G01V 1/366
340/853.1
2015/0168575 A1* 6/2015 Hatchell ............ G01V 1/308
367/7

OTHER PUBLICATIONS

International Search Report and Written Opinion, Application No. PCT/EP2014/068123, 9 pages.
Hatchell et al., "Suppressing 4D-noise by weighted stacking of up-going and down-going migrations," SEG Expanded Abstracts, SEG Las Vegas 2012 Annual Meeting, p. 1-5; 5 pages.
Barr et al., "Attenuation of Water-Column Reverberations Using Pressure and Velocity Detectors in a Water-Bottom Cable," SEG Expanded Abstracts, 653-656; 4 pages.
Calvert, Rodney, "Insights and Methods for 4D Reservoir Monitoring and Characterization. SEG Distinguished," Instructor Short Course, No. 8., Chapter 1, 15 pages.
Carlson et al., "Increased resolution of seismic data from a dual-sensor streamer cable," SEG Expanded Abstracts, 994-998; 5 pages.
Mayne, W. H., "Common Reflection Point Horizontal Data Stacking Techniques," Geophysics, vol. 27, No. 6, Part II, 927-938; 12 pages.
Robinson, J. C., "Statistically Optimal Stacking of Seismic Data," Geophysics, vol. 35, No. 4, 436-446; 11 pages.
Poole, G., "Pre-migration receiver de-ghosting and re-datuming for variable depth streamer data," SEG Expanded Abstracts, SEG Houston 2013 Annual Meeting; 5 pages.
Soubaras, R., "Ocean bottom hydrophone and geophone processing," SEG Expanded Abstracts, 24-27; 4 pages.
Office Action in European Application No. 14 757 908.0 dated Mar. 5, 2019. (References not submitted herewith have been previously made of record.).

* cited by examiner

4D NOISE SUPPRESSION

CROSS-REFERENCED TO RELATED APPLICATIONS

This present application is a U.S. National Stage Application of International Application No. PCT/EP2014/068123 filed Aug. 27, 2014, which designates the United States, and which claims the benefit of priority under 35 U.S.C. § 119 from U.S. Provisional Application Ser. No. 61/920,373, filed on Dec. 23, 2013, and U.S. Provisional Application Ser. No. 61/870,492, filed Aug. 27, 2013, which are incorporated by reference in their entirety for all purposes.

TECHNICAL FIELD

The present invention relates generally to seismic imaging and, more particularly, to systems and methods for 4D noise suppression.

BACKGROUND

Seismic exploration, whether on land or at sea, is a method of detecting geologic structures below the surface of the earth by analyzing seismic energy that has interacted with the geologic structures. A seismic energy source generates a seismic signal that propagates into the earth, where the signal may be partially reflected, refracted, diffracted, and/or otherwise affected by one or more geologic structures such as, for example, interfaces between underground formations having varying acoustic impedances. Seismic receivers placed at or near the earth's surface, within bodies of water, or below the earth's surface in well-bores are able to detect the affected seismic signal and record it. The recordings are processed to generate information about the location and physical properties of the subsurface geologic structures that interacted with the seismic signal.

A set of recordings taken during a particular time period may be referred to as a "survey." One or more signals recorded from a single survey may be used to generate an image of the subsurface formations. Such images, referred to as "3D images," indicate the state of the subsurface formations during the time period in which the survey was taken. Multiple realizations of 3D images can also be generated. As used herein, "realizations" may refer to different 3D images generated from the same survey. Different realizations can be prepared, for example, from "up-going" and "down-going" wavefields, which result from the same wavefront arriving at the receivers from different directions (e.g., before and after reflecting off of a nearby surface). Different realizations can also be generated from different selections of traces or from different processing of the same traces.

Seismic data can be gathered at different times to facilitate "time-lapse" or "4D" imaging. 4D processing of two seismic datasets recorded at different times can be used to determine how and where the Earth's properties have changed. For example, 3D images from surveys taken at different times can be compared to generate "4D images," which are also referred to as "4D differences." The earlier survey is referred to as the "baseline" survey, and the later survey is referred to as the "monitor" survey. As used herein, "realizations" may also refer to different 4D images that are generated using one or more different realizations of 3D images. For example, where a baseline survey yields a baseline 3D image, and a monitor survey yields first and second monitor 3D images, a first 4D image can be generated by differencing the baseline 3D image and the first monitor 3D image, and a second 4D image can be generated by differencing the baseline 3D image and the second monitor 3D image. As another example, where a baseline survey yields first and second baseline 3D images, and a monitor survey yields first and second monitor 3D images, a first 4D image can be generated by differencing the first baseline 3D image and the first monitor 3D image, and a second 4D image can be generated by differencing the second baseline 3D image and the second monitor 3D image.

Because 4D images are generated from seismic data acquired at different times, 4D images measure changes in subsurface formations over time. For example, 4D images may be developed in an active reservoir before and after a period of production. Such 4D images are used to identify fluid movements, or changes in fluid or lithological properties in and around a reservoir. Features of a 4D image related to fluid production may be considered "4D signal," while other unwanted elements of the image may be considered "4D noise." Seismic recordings may be distorted by coherent or incoherent noise, and 3D images and 4D images may be distorted or otherwise rendered inaccurate by such noise. Noise in two different images is considered coherent when similar noise is present in equivalent portions of both images. In contrast, incoherent noise is present in one but not both images.

4D imaging is particularly difficult to accomplish when coherent noise is present in multiple images. For example, coherent noise can be present in both the up-going and down-going realizations from the monitor survey but not in the baseline survey. In this case, the coherent noise would show up in the 4D image generated from the up-going realizations as well as the 4D image generated from the down-going realizations. While comparing the 4D images may identify certain incoherent noise, the comparison would not identify this coherent noise because it is present in both 4D images. Accordingly, 4D noise, and coherent 4D noise in particular, interferes with the ability to clearly measure changes in subsurface formations over time using 4D imaging.

SUMMARY

In accordance with one or more embodiments of the present disclosure, a method for suppressing 4D noise is disclosed. The method includes calculating a first similarity map based on the similarity of one of one or more first 3D images and a second 3D image. The one or more first 3D images are derived from a first survey recorded during a first time period, and the second 3D image is derived from a second survey recorded during a second time period. The method also includes calculating a second similarity map based on the similarity of one of the one or more first 3D images and a third 3D image, which is derived from the second survey. The method also includes calculating a third similarity map based on the similarity of first and second 4D images. The first 4D image is based on a difference between one of the one or more first 3D images and the second 3D image, and the second 4D image is based on a difference between one of the one or more first 3D images and the third 3D image. The method also includes generating a composite 4D image based at least on the first, second, and third similarity maps.

In accordance with another embodiment of the present disclosure, a system for suppressing 4D noise is disclosed. The system includes a plurality of receivers and a computer system. The computer system is configured to calculate a first similarity map based on the similarity of one of one or more first 3D images and a second 3D image. The one or more first 3D images are derived from a first survey recorded during a first time period, and the second 3D image is derived from a second survey recorded during a second time period. The computer system is also configured to calculate a second similarity map based on the similarity of one of the one or more first 3D images and a third 3D image, which is derived from the second survey. The computer system is also configured to calculate a third similarity map based on the similarity of first and second 4D images. The first 4D image is based on a difference between one of the one or more first 3D images and the second 3D image, and the second 4D image is based on a difference between one of the one or more first 3D images and the third 3D image. The computer system is also configured to generate a composite 4D image based at least on the first, second, and third similarity maps.

In accordance with another embodiment of the present disclosure, a non-transitory, computer-readable medium containing instructions for suppressing 4D noise is disclosed. The instructions are operable, when executed by a processor, to calculate a first similarity map based on the similarity of one of one or more first 3D images and a second 3D image. The one or more first 3D images are derived from a first survey recorded during a first time period, and the second 3D image is derived from a second survey recorded during a second time period. The instructions are also operable, when executed by the processor, to calculate a second similarity map based on the similarity of one of the one or more first 3D images and a third 3D image, which is derived from the second survey. The instructions are also operable, when executed by the processor, to calculate a third similarity map based on the similarity of first and second 4D images, wherein the first 4D image is based on a difference between one of the one or more first 3D images and the second 3D image, and the second 4D image is based on a difference between one of the one or more first 3D images and the third 3D image. The instructions are also operable, when executed by the processor, to generate a composite 4D image based at least on the first, second, and third similarity maps.

BRIEF DESCRIPTION OF THE DRAWINGS

For a more complete understanding of the present invention and its features and advantages, reference is now made to the following description, taken in conjunction with the accompanying drawings, which may include drawings that are not to scale and wherein like reference numbers indicate like features, in which.

DETAILED DESCRIPTION

Certain embodiments of the present disclosure provide improved 4D imaging by improving the attenuation of 4D noise, including both coherent and incoherent noise. As explained above, noise that is coherent between different realizations of 3D images will tend to show up as a difference in the 4D images generated from these realizations. For example, where noise is present in two different monitor images but not in the baseline, both 4D images will show this noise as 4D signal. Thus, 4D noise suppression that is based only on the similarity of different 4D images will treat this type of coherent noise as 4D signal. Some embodiments of the present disclosure improve 4D noise suppression by factoring in the similarity of 3D images from baseline and monitor surveys in addition to the similarity of 4D images improving the suppression of coherent noise. Processing 4D images based on both the similarity of 3D images from different surveys and the similarity of 4D images provides improved suppression of coherent and incoherent noise because the similarity of 3D images tends to emphasize regions of 4D signal while deemphasizing regions of coherent noise.

Some embodiments of the present disclosure suppress 4D noise by generating a composite 4D image based on both (1) a comparison of different 4D images and (2) a comparison of different realizations of 3D images. Generating a 4D composite image using both comparisons of different 4D images and different realizations of 3D images may improve the accuracy over analysis of 4D differences alone. Analysis of the 4D differences alone is described in Paul Hatchell et al., *Suppressing 4D-Noise by Weighted Stacking of Up-Going and Down-Going Migrations*, SEG Expanded Abstracts (2012) (hereinafter "Hatchell"), incorporated in material part by reference herein. For example, certain embodiments generate a composite 4D signal using a weighting function calculated based on the similarity of 4D images and the similarity of different realizations of 3D images. Different types of similarity calculations are discussed further below with respect to FIGS. 3-5. Weighting 4D images based on the similarity of different realizations of 3D images in addition to the similarity of different 4D images improves noise suppression by deemphasizing both coherent and incoherent noise. Suppressing 4D noise in this manner yields 4D images that more accurately reflect structural changes in the earth. These improved 4D images allow for more efficient and effective production from reservoirs by providing a clearer picture of the subsurface changes that are relevant for reservoir production. Suppressing 4D noise as described herein may therefore improve reservoir production and reduce reservoir production costs.

Different realizations of a seismic image or dataset can be created using a variety of techniques. In some embodiments, different realizations are generated from up-going wavefields and down-going wavefields. In other embodiments, different traces from the same survey are processed separately to create multiple realizations. For example, one set of traces from a survey can be stacked to generate a first realization, and a different set of traces from the same survey can be stacked to generate a second realization. As another example, different realizations may be generated by selecting different sets of data during the 4D binning process. 4D binning involves selecting compatible traces for 4D processing. During this process, traces can be ranked by their estimated compatibility based on various criteria such as, for example, source position, receiver position, midpoint position, offset, azimuth, or other suitable parameters. In such embodiments, a first realization can be generated from rank-1 traces, and a second realization can be generated from rank-2 traces. Other embodiments generate different realizations by applying different processing flows to the seismic data. For example, different de-noise or de-multiple processing sequences can used on the same or different sets of data. Alternative processing of data to create different realizations of data can be performed during any stage in a 4D processing sequence (e.g., before or after migration, before or after stacking, or during any other suitable stage). Any suitable number of realizations can be generated using these techniques, and these realizations can be utilized in the similarity calculations discussed with respect to FIG. 5 to better identify regions of genuine 4D signal.

4D noise suppression may be particularly useful in seismic imaging environments that are amenable to generating multiple realizations. Such environments include 4D processing where baseline or monitor surveys are generated by dual-component ocean bottom nodes (OBN) or ocean bottom cables (OBC), 4D processing where baseline or monitor surveys utilize variable-depth streamers or multi-sensor streamers with pre-migration deghosting technology, and 4D processing where pre-migrating deghosting or other technology enables the separation of up-going and down-going wavefields.

Figure 1:
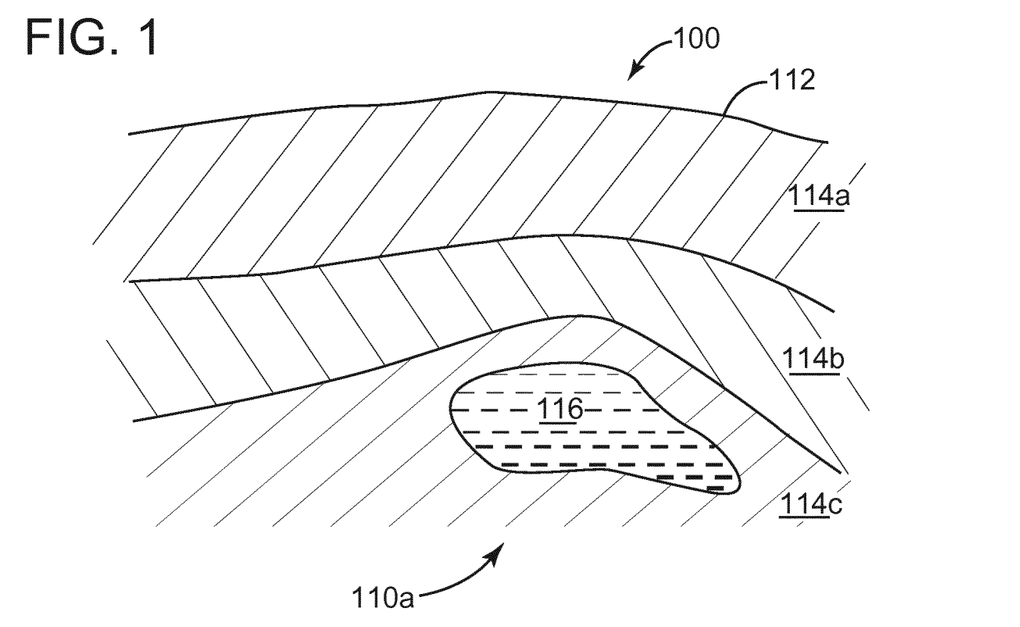
FIGS. 1 and 2 illustrate cross-sectional views of an area that may be imaged at different times in accordance with some embodiments of the present disclosure.
Figure 2:
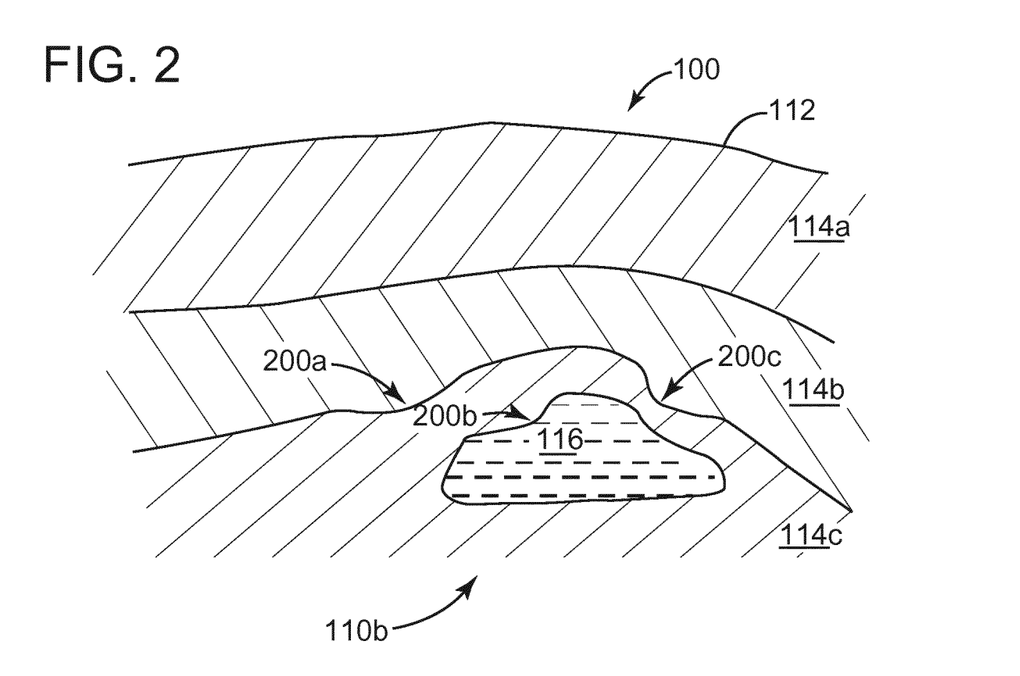
Figure 4A:
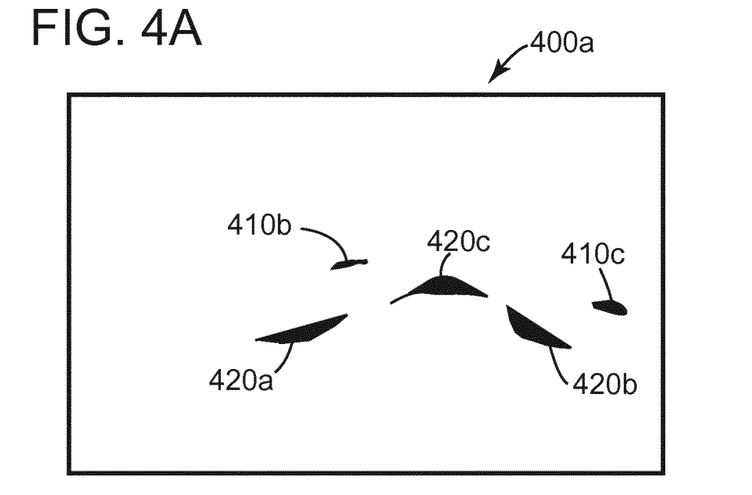
FIGS. 4A-4B illustrate example 4D images that may be generated in accordance with some embodiments of the present disclosure.
Figure 4B:
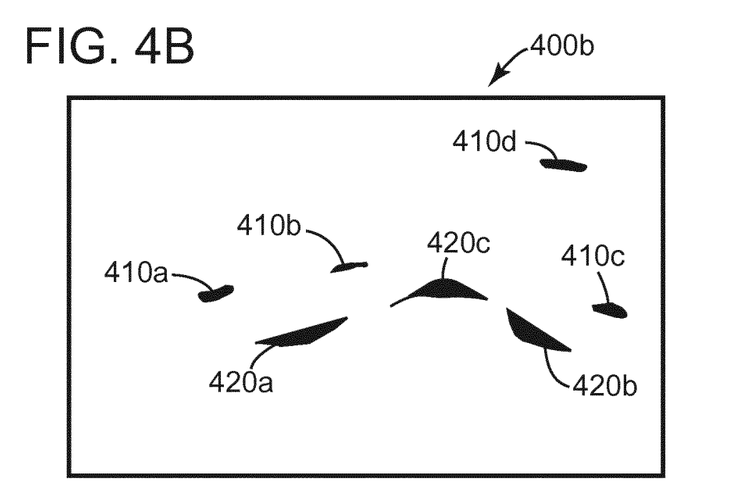

FIGS. 1 and 2 illustrate cross-sectional views of an area that may be imaged at different times in accordance with some embodiments of the present disclosure. Areas 110a and 110b include surface 112, layers 114, and reservoir 116, shown at two different points in time. For example, areas 110a and 110b may correspond to time periods before and after a period of fluid production from reservoir 116. Area 110b contains substantially the same geological features as area 110a with the exception of regions 200a-200c. Regions 200a-200c include geological structures that have changed relative to their previous state, which can include the shifting of solid materials, changes in fluid properties or distribution, or other physical changes. 4D imaging can be used to illustrate these changes. 4D images generated from surveys of areas 110a and 110b will include 4D signal corresponding to regions 200a-200c, as illustrated in FIGS. 4A and 4B discussed below.

Figure 3A:
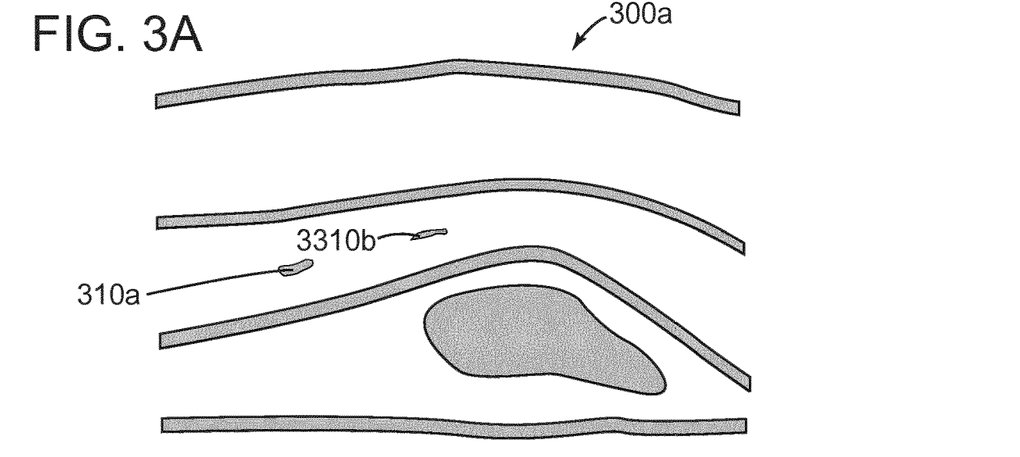
FIGS. 3A-3C illustrate portions of example 3D images that may be generated by some embodiments of the present disclosure.

FIGS. 3A-3C illustrate portions of example 3D images that may be generated by some embodiments of the present disclosure. FIG. 3A illustrates an example 3D image generated from a survey of area 110a. 3D image 300a includes 3D signal corresponding to boundaries between surface 112, layers 114, and reservoir 116. 3D image 300a also includes regions of 3D noise, including noise 310a and 310b. Noise 310a and 310b may be the result of any noise-generating factor described above, such as, for example, residual multiples. When additional 3D images are generated at a later time, 3D image 300a can be used as a baseline image for 4D processing. For example, 4D images 400a and 400b (shown in FIGS. 4A and 4B) represent 4D images generated using 3D image 300a, or another 3D image from the same survey, as a baseline image. While only a single 3D image is shown corresponding to area 110a of FIG. 1, multiple realizations may be generated. For example, realizations from up-going and down-going wavefields may be generated from the baseline survey and used in the generation of 4D images and in noise-suppression processing described below. Up-going wavefields are generated by rays that are received on an up-going path and down-going wavefields are generated by rays that are received on a down-going path, as discussed in further detail with respect to FIG. 6. Various embodiments may utilize multiple realizations that are generated using any suitable technique for creating separate realizations, as discussed further below.

Figure 3B:
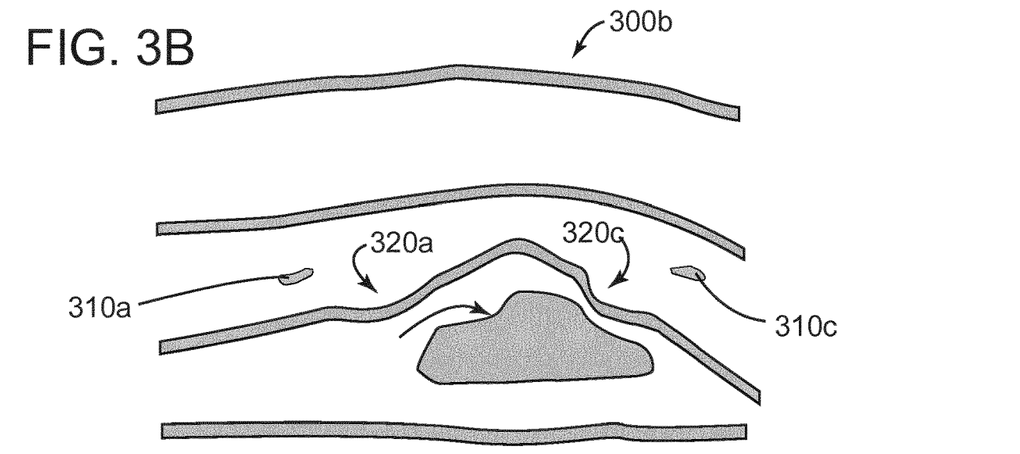
Figure 3C:
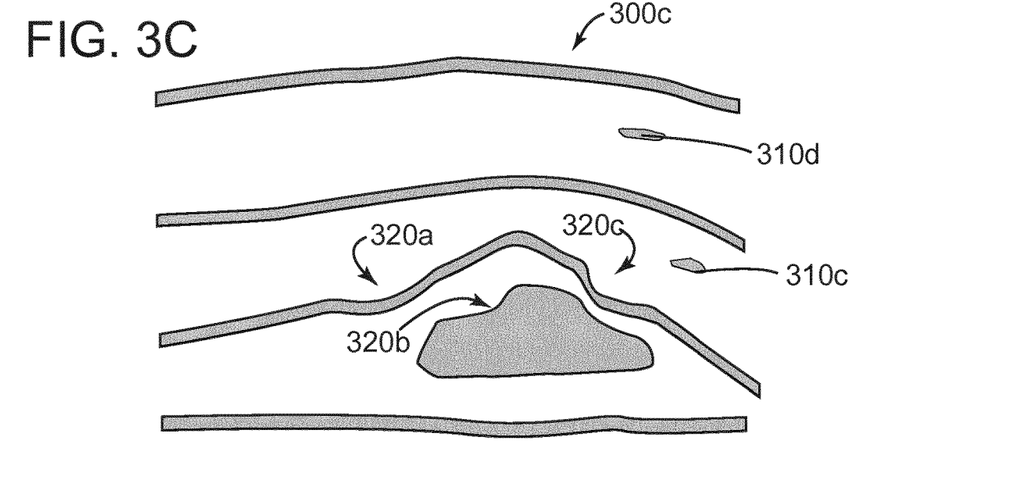

FIGS. 3B and 3C illustrate example realizations generated from a survey of area 110b shown in FIG. 2. 3D images 300b and 300c include 3D signal corresponding to boundaries between surface 112, layers 114, and reservoir 116. 3D images 300b and 300c also include regions of 3D noise. 3D image 300b includes noise 310a and 310c, and 3D image 300c includes noise 310c and 310d. 3D images 300b and 300c also include regions 320a-320c, which correspond to the geological shifts shown at regions 200a-200c, respectively, in FIG. 2. Noise 310a, 310c, and 310d may be the result of any noise-generating factor described above, such as, for example, residual multiples. Noise 310a, which is present in 3D image 300a but not 3D image 300c, is incoherent with respect to these images. In contrast, noise 310c, which is present in both 3D image 300b and 3D image 300c, is coherent with respect to these images. 3D images 300b and 300c can be used as monitor images for 4D processing with 3D image 300a or any other 3D image from a different survey that serves as a baseline. For example, 4D images 400a and 400b (shown in FIGS. 4A and 4B) represent 4D images generated using 3D images 300b and 300c, respectively, as the monitor image.

3D images 300b and 300c represent different realizations of the same dataset or survey. Realizations can be created using any method for generating different realizations described in more detail below with respect to FIG. 6. For example, different realizations can be generated from up-going and down-going wavefields. While only two realizations are shown, any number of realizations can be generated from the baseline survey or from the monitor survey for use in the 4D noise suppression methods described herein.

In some embodiments, 4D noise suppression factors in the similarity between baseline and monitor images. As used herein, similarity refers to any function or comparison whose output reflects the extent to which the input data is alike. Some embodiments calculate similarity maps, which reflect the similarity between corresponding regions of the inputs. Similarity is calculated using semblance or cross-correlation operations in certain embodiments. For example, a similarity map, S, of two images, $I_1$ and $I_2$, can be calculated as S=semblance($I_1$, $I_2$). As another example, a similarity map S, of two images, $I_1$ and $I_2$, can be calculated as the cross-correlation of $I_1$ and $I_2$ at a time lag of zero. However, any suitable method of evaluating the similarity between datasets may be used.

Similarities of baseline and monitor 3D images tend to have larger values in regions corresponding to 4D signal, since such regions are often located on or near reflectors, such as interfaces or reservoirs. Such similarities also tend to have lower values in regions of coherent 4D noise. For example, residual multiples present in the baseline realizations may have kinematic differences, or be absent entirely, in monitor realizations (or vice versa). Since baseline and monitor images may not show the same noise in such cases, the similarity between the baseline and the monitor in such regions will tend to be lower in areas associated with this type of noise. However, when such noise is coherent between the realizations from the same survey, 4D images generated from both realizations will treat it as 4D signal. The similarity of these 4D images will therefore have a larger value in such regions because the same noise is present in both 4D images. Using the similarity between 3D images from different surveys in 4D processing therefore provides improved 4D noise suppression by identifying noise that is coherent between two realizations from the same survey, since this type of coherent noise would appear in both 4D images and would therefore appear to be 4D signal if noise suppression processing utilized only a comparison of the 4D images.

FIGS. 4A and 4B illustrate example 4D images that may be generated by some embodiments of the present disclosure. 4D image 400a depicts a 4D difference between 3D images 300a and 300b, and 4D image 400b depicts a 4D difference between 3D images 300a and 300c. 4D image 400a includes regions 410b, 410c, and 420a-420c. 4D image 400b includes regions 410a-410d and 420a-420c. Some embodiments generate 4D images from two 3D images that were derived in a similar manner (e.g., both derived from up-going or down-going wavefields, using the same processing method, or using the same trace selections). However, some embodiments may generate one or more 4D images from 3D images that were derived using different techniques.

Regions 410a-410d represent high-difference areas of a 4D image that are caused by noise in the underlying 3D images. Regions 410a-410d may therefore be characterized as 4D noise. Regions 410a-410d correspond to noise 310a-310d, respectively, from FIGS. 3A-3C. Regions 410a and 410b are present in 4D image 400a because the corresponding noise is present in one of the underlying 3D images but not the other. Similarly, regions 410a-410d are present in 4D image 400b because the corresponding noise is present in one of the underlying 3D images but not the other. For example, region 410d is present in 4D image 400b because noise 310d is present in 3D image 300c but not 3D image 300a.

Regions 420a-420c represent high-difference areas of a 4D image that correspond to changes in geological structures. Regions 420a-420c may therefore be characterized as 4D signal. Regions 420a-420c correspond to regions 320a-320c, respectively, from FIGS. 3B and 3C. These areas reflect geological changes that occurred between the monitor and baseline surveys, as shown in FIGS. 1 and 2.

In some embodiments, 4D noise suppression factors in the similarity of different 4D images. For example, a comparison of 4D images 400a and 400b shows that these images are similar in regions 410b, 410c, and 420a-420c. Thus, calculating the similarity of 4D images 400a and 400b will properly identify regions 410a and 410d as noise. As shown in FIGS. 3B and 3C, such noise is incoherent between 3D images 300b and 300c. However, noise that is coherent between the realizations of the same survey may not be attenuated by consideration of the similarity of 4D images alone. For example, noise 310b and 310c is coherent within the same survey and therefore appears in both 4D images 400a and 400b as regions 410b and 410c, respectively. Because they are present in both 4D images, regions 410b and 410c may not be suppressed by analysis of the 4D differences alone, as described in Hatchell, referenced above. 4D noise suppression may therefore be improved by factoring the similarity of the 3D images in addition to the similarity of the 4D images. For example, noise 310b is present in the baseline image (i.e. 3D image 300a from FIG. 3A) but not in the monitor realizations (i.e. 3D images 300b and 300c). Similarly, noise 310c is present in the monitor realizations but not the baseline image. The similarity of 3D images 300a and 300b will therefore show low levels of similarity at these regions, as will the similarity of 3D images 300a and 300c. Thus, factoring in the similarity of different realizations of the baseline and monitor images as described herein improves 4D noise suppression by identifying noise that is coherent between the realizations and that may otherwise be misinterpreted as 4D signal.

Figure 5:
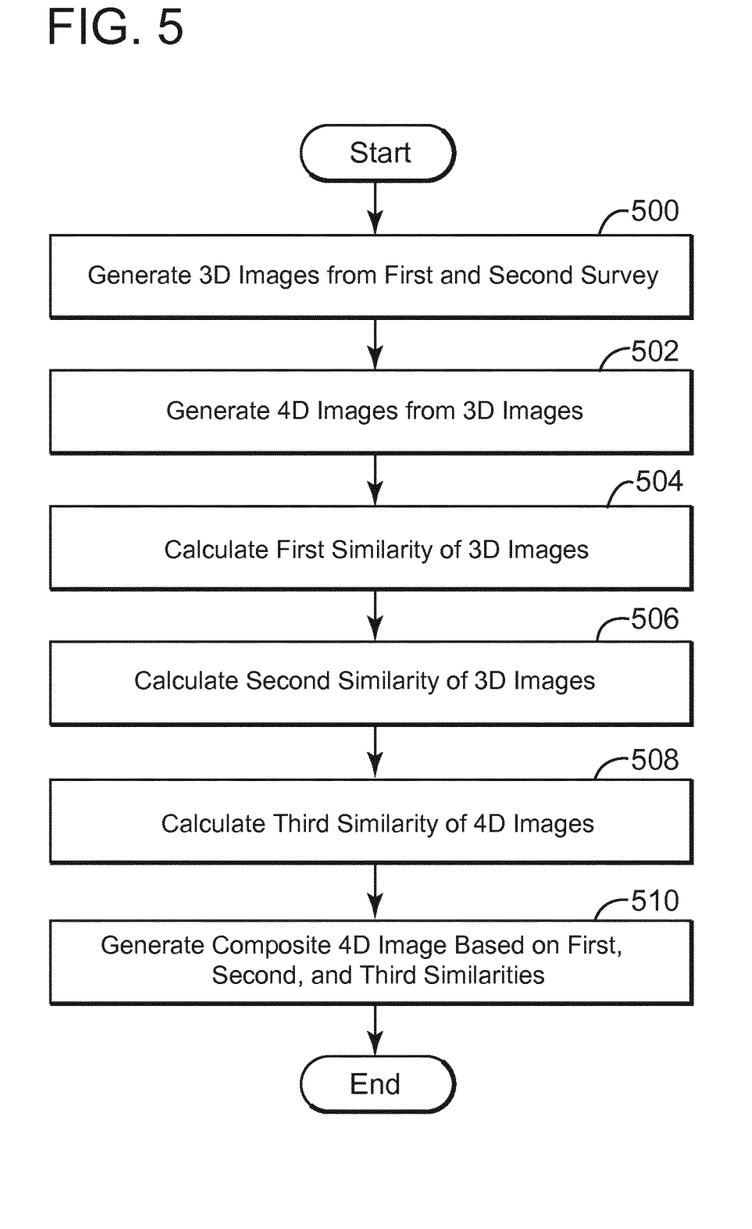
FIG. 5 illustrates a flow chart of an example method for suppressing noise in 4D images in accordance with some embodiments of the present disclosure.

FIG. 5 illustrates a flow chart of an example method for suppressing noise in 4D images in accordance with some embodiments of the present disclosure. The processing steps discussed below can be performed by computer system 806 (shown in FIG. 8) or any other suitable component of system 600 or 700 shown in FIGS. 6 and 7, respectively.

At step 500, 3D images are generated from first and second surveys. The first and second surveys can be baseline and monitor surveys taken during different time periods. Such surveys may be separated by any suitable amount of time, such as, for example, hours, days, weeks, months, or years. In addition to generating 3D images from different surveys, the seismic system, such as system 600 or 700 shown in FIGS. 6 and 7, respectively, also generates different 3D images from the same survey. For example, system 600 may generate two or more realizations from the first survey and one or more realizations from the second survey. In other embodiments, any number of realizations may be generated from each survey. Some embodiments generate 3D images in post-migration gather form, though this is not required. Such embodiments may have a range of common-offset images forming the gathers. Different realizations can be generated using any data or methods described above. For example, the realizations are generated from up-going wavefields and down-going wavefields in some embodiments. Other embodiments, however, may utilize any suitable method of generating multiple realizations (e.g., using different algorithms at one or more stages in the 4D imaging process, generating different images from different trace selections, or any other technique discussed above for producing multiple realizations).

At step 502, 4D images are generated from the 3D images generated during step 500. For example, some embodiments generate a first 4D image from the up-going baseline and monitor 3D images and a second 4D image from the down-going baseline and monitor 3D images. Other embodiments may generate 4D images from any suitable combination of 3D images to provide two or more 4D images that incorporate different realizations of 3D data. For example, where a baseline survey yields a baseline 3D image, and a monitor survey yields first and second monitor 3D images, a first 4D image can be generated by differencing the baseline 3D image and the first monitor 3D image, and a second 4D image can be generated by differencing the baseline 3D image and the second monitor 3D image. As another example, where a baseline survey yields first and second baseline 3D images, and a monitor survey yields first and second monitor 3D images, a first 4D image can be generated by differencing the first baseline 3D image and the first monitor 3D image, and a second 4D image can be generated by differencing the second baseline 3D image and the second monitor 3D image. Any suitable number of 4D images can be generated.

At step 504, a first similarity of the 3D images is calculated. For example, in some embodiments, computer system 806 generates a first similarity map based on the similarity between a 3D image from the first survey and a 3D image from the second survey. As a specific example, the first similarity may be based on the similarity between an up-going baseline 3D image and an up-going monitor 3D image. Some embodiments calculate the similarity of 4D images in gather form, though other embodiments may utilize stacked data. In some embodiments, the similarity is calculated using running time-windows to compare baseline and monitor data at common spatial bins and offset classes. Similarity is calculated using semblance or cross-correlation in certain embodiments, though any suitable method of characterizing the extent to which 3D images are alike may be used. Furthermore, such methods may use any suitable level of spatial granularity.

At step 506, a second similarity of the 3D images is calculated. The second similarity can be calculated using any method or data described above with respect to step 504, though one or more of the 3D images used may be different. For example, where the first similarity is calculated using a first baseline image and a first monitor image, the second similarity may be calculated using the first baseline image and a second monitor image, a second baseline image and the first monitor image, a second baseline image and a second monitor images, or any other suitable combination of realizations. As a specific example, where the first similarity is calculated using up-going images, the second similarity may be calculated using down-going images, or vice versa. Using one or more different realizations to calculate the first and second similarities provides improved 4D noise suppression by allowing a calculation of a similarity of the first and second similarities that can identify certain noise that is coherent between the realizations.

At step 508, a third similarity between the 4D images generated in step 502 is calculated. The third similarity may be calculated using any method described above with respect to step 504, though the inputs are 4D images rather than 3D images. Some embodiments calculate the similarity of 4D images in gather form, though other embodiments may utilize stacked data. As explained above, the similarity of 4D images may indicate which portions of the 4D images are in fact incoherent noise since incoherent noise appears in one of the 4D images but not the other.

In some embodiments, a clipping function is applied to one or more similarity maps generated in steps 504, 506, and 508 before proceeding to step 510. Clipping functions may remove (e.g., set to zero) or modify one or more portions of a similarity map that falls below a threshold level of similarity. This threshold level may be preconfigured, set by a user, or automatically calculated by computer system 806. For example, the threshold value may be calculated based on an analysis of particular regions of the similarity map or maps. Such regions can be based on a certain offset or time range of the gathers. In embodiments utilizing clipping functions, the "clipped" maps can be used to calculate the weighting functions or otherwise generate the composite 4D signal as discussed below with respect to step 510. Using clipping functions in this manner creates similarity maps that register only sufficiently high levels of similarity. Because regions of 4D signal tend to have the larger similarity values, and certain noise may still have positive but relatively smaller similarity values, "clipping" or "pruning" the similarity maps to avoid highlighting these small similarity values tends to emphasize 4D signal. Basing the composite 4D image generated in step 510 on such "clipped" similarity maps can yield composite 4D images that more precisely emphasize areas of 4D signal. For example, in embodiments that generate the composite image using weighted stacking of the 4D images, the weighting functions can be based on the "clipped" similarity maps, which allows the component 4D images to be weighted signal-to-noise ratios of the component images, yielding improved noise suppression.

At step 510, a composite image is calculated based on the first, second, and third similarities. For example, where 4D images are generated from different pairs of 3D images, some embodiments generate a weighting function for each 4D image based on the similarity of (1) the similarity of the 3D images that were used to generate the 4D image and (2) the similarity of the 4D images. These weighting functions are used to generated a weighted stack of the 4D images. For example, where first and second 4D images use first and second realizations, respectively, and first and second similarities are calculated from the first and second realizations, respectively, a weighting function for the first 4D image can be calculated as the similarity between (1) the first similarity and (2) the similarity of the 4D images. Similarly, a weighting function for the second 4D image can be calculated using the similarity between (1) the second similarity and (2) the similarity of the 4D images. Using both similarities provides improved 4D noise suppression by attenuating both coherent and incoherent noise. Where the first and second 4D images are $D_1$ and $D_2$, respectively, the similarity of 3D images based on the first realization is $S_1$, the similarity of 3D images based on the second realization is $S_2$, and the similarity of the 4D images is $S_D$, the weight functions for the first and second 4D images can be shown as $S_{1,D}$ (the similarity between $S_1$ and $S_D$) and $S_{2,D}$ (the similarity between $S_2$ and $S_D$), respectively. The weighted 4D image is therefore a weighted stack of the 4D images calculated using the following operation:

$$((S_{1,D} \times D_1) + (S_{2,D} \times D_2))/(S_{1,D} + S_{2,D}).$$

Analogous operations can be performed with any suitable number of 4D images. Applying weighting functions that are calculated based on the similarity between different realizations of 3D images and the similarity between 4D images provides improved 4D noise suppression by attenuating both coherent and incoherent noise. Weighting functions can be applied to a 4D image as a whole or to one or more portions or precursors of the 4D images. Furthermore, weighting functions may be applied to any suitable number of 4D images to generate the composite 4D image.

In a specific embodiment, the sequence illustrated in FIG. 5 is used to generate a composite 4D image as follows. Different realizations of 3D images are generated from up-going and down-going wavefields. The up-going and down-going realizations for the baseline survey are referred to as $B_1$ and $B_2$, respectively, and the up-going and down-going realizations for the monitor survey are referred to as $M_1$ and $M_2$, respectively. A first 4D image, referred to as $D_1$, is then generated based on the difference between $B_1$ and $M_1$, and a second 4D image, referred to as $D_2$, is generated based on the difference between $B_2$ and $M_2$. A first similarity map, $S_1$, is calculated based on the semblance of $B_1$ and $M_1$ using running time windows to compare $B_1$ and $M_1$ at common spatial bins and offset classes. A second similarity map, $S_2$, is calculated based on the semblance of $B_2$ and $M_2$, again using running time windows to compare $B_2$ and $M_2$ at common spatial bins and offset classes. A third similarity map, $S_3$, is calculated based on the semblance of $D_1$ and $D_2$. Weighting functions for $D_1$ and $D_2$ are then calculated based on these similarity maps. The weighting function for $D_1$, referred to as $S_{1,D}$, is calculated as the semblance of $S_1$ and $S_3$, and the weighting function for $D_2$, referred to as $S_{2,D}$, is calculated as the semblance of $S_2$ and $S_3$. A weighted stack of the 4D images is then calculated as $((S_{1,D} \times D_1)+(S_{2,D} \times D_2))/(S_{1,D}+S_{2,D})$. Calculating a composite image in this manner provides improved 4D imaging by attenuating both coherent and incoherent noise.

Various embodiments may perform some, all, or none of the steps described above. For example, certain embodiments may omit step 500 or 502 under certain conditions, such as, for example, when 3D images or 4D images have been generated by a different system. Furthermore, certain embodiments may perform these steps in different orders or in parallel, and certain embodiments may modify one or more steps. For example, the various similarities may be calculated in any suitable order. Moreover, one or more steps may be repeated. For example, multiple 3D images and 4D images may be generated, and the processing steps described herein may be performed on all such images to generate weighted stacks from any suitable number of inputs. Additionally, computer system 806 or any suitable component of the seismic system may perform one or more steps of the sequence.

Figure 6:
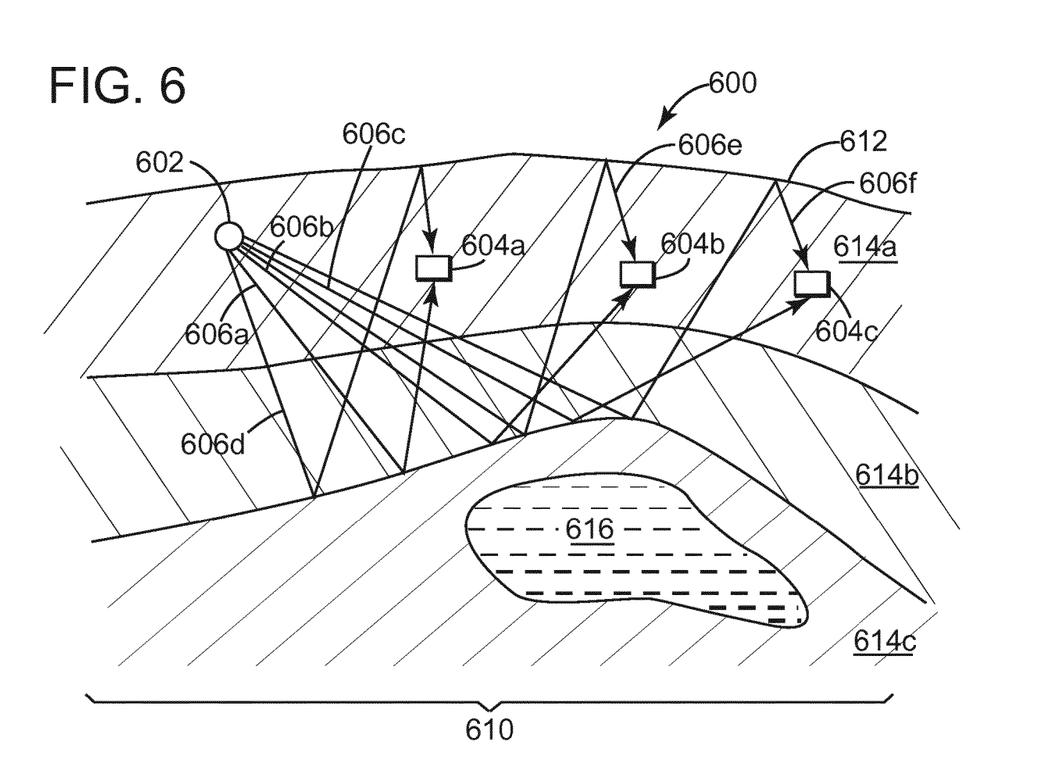
FIG. 6 illustrates a cross-sectional view of a seismic imaging system that may be used to suppress 4D noise by identifying both coherent and incoherent noise in accordance with some embodiments of the present disclosure.

FIG. 6 illustrates a cross-sectional view of a seismic imaging system that may be used to suppress 4D noise by identifying both coherent and incoherent noise in accordance with some embodiments of the present disclosure. In the illustrated embodiment, system 600 includes source 602 and receivers 604, which are located in area 610. Area 610 includes surface 612, layers 614, and reservoir 616. Although FIG. 6 depicts a land implementation of system 600, other embodiments of the present disclosure may also be used in marine environments (as shown, for example, in FIG. 7), transition zones, or in any other environment where seismic imaging is performed.

System 600 may be any collection of systems, devices, or components configured to detect, record, and process seismic data to suppress 4D noise. The images produced by system 600 may allow for the evaluation of subsurface geology and the isolation of problematic noise. System 600 includes one or more sources 602 and one or more receivers 604, which are located within the pre-determined area 610 selected for seismic survey. Seismic rays 606a-606f (such as, for example, acoustic wave trains) propagate out from one or more sources 602 and may be partially reflected, refracted, diffracted, or otherwise affected by one or more subsurface structures such as rock layers beneath the earth's surface. These waves are ultimately recorded by one or more receivers 604 and processed to generate images of the subsurface.

Source 602 may be any device that is operable to generate seismic waves. Source 602 may include any type of seismic device that generates controlled seismic energy such as a seismic vibrator, vibroseis, dynamite, air gun, thumper truck, or any other suitable seismic energy source. Source 602 may utilize electric motors, counter-rotating weights, hydraulics, explosives, or any other suitable structure that is configured to generate seismic energy. Source 602 can be located in any position that results in seismic activity that can be measured by receivers 604. For example, sources 602 can be located on surface 612, above surface 612, or below surface 612 in certain embodiments. System 600 may include any suitable number, type, configuration, and/or arrangement of sources 602. In some embodiments, source 602 is operated by a central controller that coordinates the operation of multiple sources 602. Furthermore, a positioning system, such as a global positioning system (GPS), may be utilized to locate and/or time-correlate multiple sources 602. The 4D noise suppression of system 600 is not limited to a particular type or configuration of source 602. For example, source 602 can have any structure, configuration, or function described with respect to FIGS. 6-8.

Receivers 604 may be any devices that are operable to record seismic waves. Receivers 604 convert seismic energy into recorded signals, which may have any suitable format. For example, certain embodiments of receiver 604 convert seismic energy to electrical energy, allowing seismic waves to be recorded as voltage measurements, current measurements, or any suitable type of electrical measurement. Other embodiments of receiver 604 can record seismic energy as an optical signal or any suitable type of signal that corresponds to the received seismic energy. The recorded signals may be analog, digital, or any suitable format. After the seismic energy is received and converted, the resulting signals are transmitted to and recorded by recording units that may be local to or remote from receivers 604. Recordings may then be communicated to computer system 806 for processing, as described further below with respect to FIG. 8. The 4D noise suppression of system 600 is not limited to a particular type or configuration of receivers 604, and system 600 may utilize any suitable number, type, arrangement, and configuration of receivers 604. For example, receivers 604 may have any structure, configuration, or function described with respect to FIGS. 6-8.

Receivers 604 may be arranged in a grid at different distances and at different lateral offsets from source 602. Some embodiments may also utilize receivers 604 at different depths, providing a three-dimensional array of receivers 604. Source 602 may be located along an axis of receivers 604 or off such axes. Various embodiments may use any suitable number, type, configuration, and/or arrangement of sources 602 and receivers 604.

After various signals are recorded by receivers 604, the data may be collected and organized based on offset distances, such as the distance between source 602 and a particular receiver 604 or the amount of time it takes for the signals to reach receivers 604. The amount of time a signal takes to reach a receiver may be referred to as the "travel time." Data received by a particular receiver 604 may be referred to as a "trace," and multiple traces may be gathered, processed, and utilized to generate a composite model of the subsurface. A "gather" refers to any set of seismic data grouped according to a common feature. For example, a series of traces reflected from the same common subsurface point may be referred to as a common midpoint gather (CMP). Other examples of gathers include common conversion point (CCP) gather, a common shot gather (one source 602 or shot received by multiple receivers 604), common receiver gather (multiple sources 602 received by one receiver 604) (CRG), or any other suitable type of gather based on the implementation or goals of the processing. The traces from a gather may be summed (or "stacked"), which may improve the signal-to-noise ratio (SNR) over a "single-fold" stack because summing tends to cancel out incoherent noise. A "fold" indicates the number of traces in a gather. One or more gathers can be processed to generate an image, which refers to any spatial representation of the subsurface or the data underlying such a representation.

Area 610 represents the area being surveyed by system 600. As discussed above, area 610 may be an on-shore area, offshore area, or both. Area 610 may be an area that is not currently being utilized for production, or it may be an area that is currently being utilized for production. For example, area 610 may include a reservoir 616 that is being actively developed, and surveys may be conducted multiple times during the period of exploration or production. Suppressing 4D noise as described herein may provide more accurate information about structural changes or changes in fluid properties or distribution in area 610 before, during, and after a production period.

Surface 612 represents the surface of area 610. Surface 612 may be an air-earth boundary or a water-earth boundary depending on the location of area 610. Surface 612 can reflect seismic waves generated by sources 602, which may cause receivers 604 to record waves that have reflected multiple times. Signals from waves that have reflected multiple times are referred to as "multiples."

Layers 614 represent geological layers of area 610. Area 610 may have any number, composition, and/or arrangement of layers 614. Seismic waves will be refracted, reflected, or otherwise affected when traveling through layers 614, particularly at the interfaces between different layers 614. Layers 614 may have various densities, thicknesses, or other characteristics that may affect seismic wave propagation. Over time, factors such as changes in temperature, changes in moisture, and shifting particles may change the velocity, amplitude, or other aspects of wave propagation. These changes in properties can produce noise in 4D signals due to their effect on seismic signals passing through the earth before or after reflecting off of other structures.

Reservoir 616 may be any geological formation targeted for production. For example, reservoir 616 may contain oil, gas, or any other targeted material. In embodiments involving actively producing reservoirs 616, reservoir production may cause changes to reservoir 616 (such as, for example, fluid displacement) or the surrounding layers 614 that may affect the optimal exploration or production strategy. Dynamically stabilizing measured signals as described herein may reduce costs, improve production, and improve safety by providing more accurate depictions of the changes in area 610 over time.

When source 602 emits seismic waves, rays 606a-606f ("rays 606") may be propagated through layers 614 and reservoir 616. Rays 606 represent portions of seismic waves generated by source 602 that arrive at receivers 604. While only a small number of rays 606 are shown, wavefields generated by source 602 may reach receivers 604 via numerous paths. Rays 606 may be reflected, refracted, diffracted, and/or otherwise affected by one or more geologic structures. The timing, amplitudes, frequencies, or other aspects of the recorded signals resulting from rays 606 provide information about the positions, compositions, or other qualities of subsurface structures. Portions of a signal resulting from the same wavefront arriving at a receiver 604 at different times after following different paths are referred to as "multiples." For example, certain rays 606 may arrive at receivers 604 after multiple reflections.

Rays 606a-606c are recorded by receivers 604 after reflecting off the boundary between layers 614b and 614c. Because rays 606a-606c are recorded by receivers 604 on an upward path, rays 606a-606c are considered up-going signals. In contrast, rays 606d-606f are recorded by receivers 604 after reflecting off surface 612. Because rays 606d-606f are recorded by receivers 604 on a downward path, rays 606d-606f are considered down-going signals. Up-going and down-going signals may contain coherent noise, which is correlated between the signals, and incoherent noise, which is uncorrelated between the signals. The up-going and down-going signals recorded by receivers 604 can be used to generate different realizations that are used by system 600 to suppress 4D noise, as explained further with respect to FIGS. 1-5.

Figure 7:
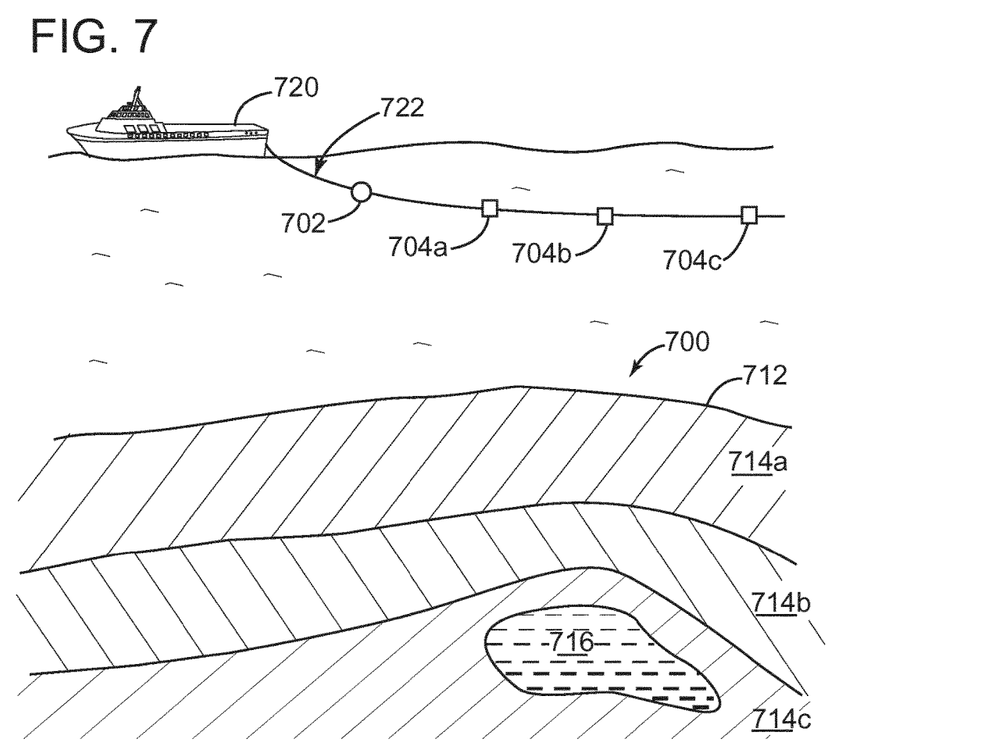
FIG. 7 illustrates a cross-sectional view of an alternative seismic imaging system employed in an offshore environment in accordance with some embodiments of the present disclosure.

As explained above, the suppression of 4D noise based on both the similarity of different realizations of 3D images and the similarity of different realizations of 4D images can be applied to seismic imaging systems in a wide variety of survey environments. While FIG. 6 illustrates a seismic imaging system for suppressing 4D noise on land, similar systems can be employed in marine environments, in transition zones, or in any area in which seismic imaging is performed. For example, FIG. 7 illustrates a cross-sectional view of an alternative seismic imaging system 700 employed in an offshore environment in accordance with some embodiments of the present disclosure. In the illustrated embodiment, boat 720 tows streamer 722 to which source 702 and receivers 704 are attached. Source 702 and receivers 704 may have any suitable structure, configuration, or function described above with respect to FIG. 6. In some embodiments, boat 720 moves along the surface of the water while source 702 emits seismic waves at repeated intervals. Other offshore embodiments may utilize receivers 704 that are not attached to boat 720. For example, receivers 704 may be positioned on or below the sea floor. The present disclosure contemplates applying 4D noise suppression using any suitable configuration of sources 702 and receivers 704 in any suitable survey environment.

Figure 8:
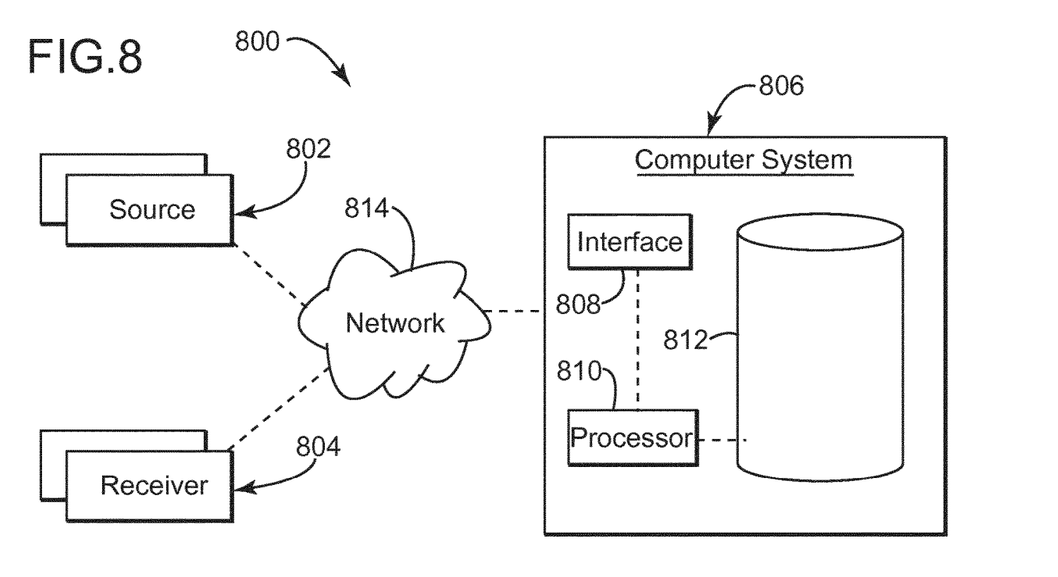
FIG. 8 illustrates a schematic of an example seismic imaging system that provides improved suppression of 4D noise in accordance with some embodiments of the present disclosure.

FIG. 8 illustrates a schematic of an example seismic imaging system 800 that provides improved suppression of 4D noise in accordance with some embodiments of the present disclosure. System 800 includes sources 802, receivers 804, and computer system 806 communicatively coupled via network 814, which can include one or more wired or wireless networks, or any suitable combination thereof.

4D noise suppression performed by computer system 806 can be used to improve images that have been generated from signals originating from a wide variety sources 802. Computer system 806 can operate in conjunction with sources 802 having any structure, configuration, or function described above with respect to FIGS. 6 and 7. In particular embodiments, sources 802 may be impulsive or vibratory. Impulsive sources, such as explosives or air guns, may generate a short, high-amplitude seismic signals while vibratory sources may generate lower-amplitude signals over a longer period of time. Vibratory sources may be instructed, by means of a pilot signal, to generate a target seismic signal with energy at one or more desired frequencies, and these frequencies may vary over time. However, the seismic wave actually generated by source 802 may differ from the target seismic signal. For example, harmonic distortion may occur when source 802 injects energy at harmonics of the desired frequencies.

As another example, certain sources 802 radiate varying frequencies of seismic energy into area 610, as shown in FIG. 6, during a predetermined time interval. Source 802 may impart energy at a starting frequency and the frequency may change over a defined interval of time at a particular rate until a stopping frequency is reached. The impartation of a range of frequencies may be referred to as a sweep, frequency sweep, or seismic sweep. Sweeps may be linear such that the frequency changes linearly over the sweep time at a rate dictated by the starting and stopping frequencies and the sweep time. By contrast, in a nonlinear sweep, the frequency may vary nonlinearly between the starting and stopping frequencies over the sweep time. For example, a nonlinear sweep may include a quadratic sweep, a logarithmic sweep, or any other suitable sweep configuration. In some embodiments, a sweep may be continuous such that source 802 generates substantially all the frequencies between the starting and stopping frequency. In other embodiments, the frequency is gradually increased during the sweep. The gradual increase may be substantially continuous or may use various sized steps to sweep from the starting frequency to the stopping frequency. In some embodiments, a sweep may be discontinuous so that source 802 does not generate particular frequencies between the starting and stopping frequency and receivers 804 do not receive or report data at the particular frequencies.

4D noise suppression performed by computer system 806 can also be used to improve images that have been generated from signals received by a wide variety receivers 804. Computer system 806 can access recordings from receivers 804 having any structure, configuration, or function described above with respect to FIGS. 6 and 7. In particular embodiments, receivers 804 may include geophones, hydrophones, accelerometers, fiber optic sensors (such as, for example, a distributed acoustic sensor (DAS)), or any suitable device. Such devices may be configured to detect and record energy waves propagating through subsurface geology with any suitable, direction, frequency, phase, or amplitude. For example, in some embodiments, receivers 804 are vertical, horizontal, or multicomponent sensors. As particular examples, receivers 804 may comprise three component (3C) geophones, 3C accelerometers, or 3C Digital Sensor Units (DSUs). System 800 may utilize any suitable number, type, arrangement, and configuration of receivers 804. For example, system 800 may include dozens, hundreds, thousands, or any suitable number of receivers 804. As another example, receivers 804 may have any suitable arrangement, such as linear, grid, array, or any other suitable arrangements, and spacing between receivers 804 may be uniform or non-uniform. Furthermore, receivers 804 may be located at any suitable depth. For example, receivers may be located on surface 612, above surface 612, or below surface 612.

Computer system 806 may include any suitable devices operable to process seismic data recorded by receivers 804. As will be discussed herein, computer system 806 is operable to process multiple sets of seismic data to identify and remove noise to produce more accurate 4D images. Computer system 806 may be a single device or multiple devices. For example, computer system 806 may be one or more mainframe servers, desktop computers, laptops, cloud computing systems, or any suitable devices. Computer system 806 receives data recorded by receivers 804 and processes it to calculate a stabilization operator that may be applied to active signals. Computer system 806 may be operable to perform the 4D noise suppression steps described above with respect to FIG. 5. Computer system 806 may also be operable to control certain sources 802. Computer system 806 may be communicatively coupled to receivers 804 via network 814 during the recording process, or it may receive the recorded data after the collection is complete. In the illustrated embodiment, computer system 806 includes network interface 808, processor 810, and memory 812.

Network interface 808 represents any suitable device operable to receive information from network 814, transmit information through network 814, perform suitable processing of information, communicate with other devices, or any combination thereof. Network interface 808 may be any port or connection, real or virtual, including any suitable hardware and/or software (including protocol conversion and data processing capabilities) to communicate through a LAN, WAN, or other communication system that allows computer system 806 to exchange information with network 814, other software computer systems 806, sources 802, receivers 804, and/or other components of system 800. Computer system 806 may have any suitable number, type, and/or configuration of network interface 808.

Processor 810 communicatively couples to network interface 808 and memory 812 and controls the operation and administration of computer system 806 by processing information received from network interface 808 and memory 812. Processor 810 includes any hardware and/or software that operates to control and process information. In some embodiments, processor 810 may be a programmable logic device, a microcontroller, a microprocessor, any suitable processing device, or any suitable combination of the preceding. Computer system 806 may have any suitable number, type, and/or configuration of processor 810. Processor 810 may execute one or more sets of instructions to implement dynamic stabilization of seismic data, including the steps described above with respect to FIG. 3A. Processor 810 may also execute any other suitable programs to facilitate the data stabilization such as, for example, user interface software to present one or more GUIs to a user.

Memory 812 stores, either permanently or temporarily, data, operational software, or other information for processor 810, other components of computer system 806, or other components of system 800. Memory 812 includes any one or a combination of volatile or nonvolatile local or remote devices suitable for storing information. For example, memory 812 may include random access memory (RAM), read only memory (ROM), flash memory, magnetic storage devices, optical storage devices, network storage devices, cloud storage devices, solid state devices, external storage devices, or any other suitable information storage device or a combination of these devices. Memory 812 may store information in one or more databases, file systems, tree structures, any other suitable storage system, or any combination thereof. Furthermore, different types of information stored in memory 812 may use any of these storage systems. Moreover, any information stored in memory may be encrypted or unencrypted, compressed or uncompressed, and static or editable. Computer system 806 may have any suitable number, type, and/or configuration of memory 812. Memory 812 may include any suitable information for use in the operation of computer system 806. For example, memory may store computer-executable instructions operable, when executed by processor 810, to perform the steps discussed above with respect to FIG. 5. Memory 812 may also store any seismic data or related data such as, for example, raw seismic data, 3D images, 4D images, weighting functions, or any other suitable information. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 808, one or more portions of processor 810, one or more portions of memory 812, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. For example, while the embodiments of FIGS. 6 and 7 illustrate particular configurations of sources 602 and 702 and receivers 604 and 704, any suitable number, type, and configuration may be used. As another example, any suitable method of obtaining different realizations of 3D images may be used in certain embodiments. As yet another example, while this disclosure describes certain data processing operations that may be performed using the components of system 600 or 700, any suitable data processing operations may be performed where appropriate. Furthermore, certain embodiments may alternate between or combine one or more data processing operations described herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for suppressing 4D noise during seismic imaging, the method comprising:
calculating a first similarity map, $S_1$, based at least on a similarity of one, $I_1$, of one or more first 3D images and a second 3D image, $I_2$, wherein the one or more first 3D images are derived from a first survey recorded during a first time period, and the second 3D image is derived from a second survey recorded during a second time period;
calculating a second similarity map, $S_2$, based at least on a similarity of the one, $I_1$, of the one or more first 3D images and a third 3D image, $I_3$, wherein the third 3D image is derived from the second survey and is different from the second 3D image, $I_2$;
calculating a third similarity map, $S_D$, based at least on a similarity of first, $D_1$, and second, $D_2$, 4D images, wherein the first 4D image is based on a difference between the one of the one or more first 3D images and the second 3D image, and the second 4D image is based on a difference between the one of the one or more first 3D images and the third 3D image; and
generating a composite 4D image based at least on the first, second, and third similarity maps,
wherein similarity represents how much respective images are alike.

2. The method of claim 1, wherein the composite 4D image is a weighted stack of at least the first and second 4D images.

3. The method of claim 2, wherein generating the composite 4D image comprises:
calculating a first weighting function, $S_{1D}$, based at least on a similarity of the first and third similarity maps;
calculating a second weighting function, $S_{2D}$, based at least on a similarity of the second and third similarity maps; and
generating the weighted stack by:
applying the first weighting function to the first 4D image and
applying the second weighting function to the second 4D image.

4. The method of claim 1, wherein calculating the third similarity map comprises applying one of the following functions to the first and second 4D images:
semblance; and
cross-correlation.

5. The method of claim 1, further comprising modifying the first similarity map in response to determining that a portion thereof is below a threshold level of similarity.

6. The method of claim 1, wherein the second 3D image is derived from up-going wavefields, and the third 3D image is derived from down-going wavefields.

7. The method of claim 1, wherein:
the second 3D image is derived based on a first portion of the second seismic dataset; and
the third 3D image is derived based on a second portion of the second seismic dataset.

8. The method of claim 1, wherein the second and third images are derived using different processing methods on a same portion of the second seismic dataset.

9. The method of claim 1, wherein the first seismic dataset is a baseline survey and the second seismic dataset is a monitor survey.

10. A system for suppressing 4D noise, the method comprising:
a plurality of receivers; and
a computer system configured to:
calculate a first similarity map, $S_1$, based at least on a similarity of one, $I_1$, of one or more first 3D images and a second 3D image, $I_2$, wherein the one or more first 3D images are derived from a first survey recorded during a first time period from data acquired by the receivers, and the second 3D image is derived from a second survey recorded during a second time period from data acquired by the receivers;

calculate a second similarity map, $S_2$, based at least on a similarity of the one of the one or more first 3D images and a third 3D image, $I_3$, wherein the third 3D image is derived from the second survey and is different from the second 3D image;

calculate a third similarity map, $S_D$, based at least on a similarity of first, $D_1$, and second, $D_2$, 4D images, wherein the first 4D image is based on a difference between the one of the one or more first 3D images and the second 3D image, and the second 4D image is based on a difference between the one of the one or more first 3D images and the third 3D image; and generate a composite 4D image based at least on the first, second, and third similarity maps, wherein similarity represents how much respective images are alike.

11. The system of claim 10, wherein the composite 4D image is a weighted stack of at least the first and second 4D images.

12. The system of claim 11, wherein the computer system is configured to generate the composite 4D image by:

calculating a first weighting function, $S_{1D}$, based at least on a similarity of the first and third similarity maps;

calculating a second weighting function, $S_{2D}$, based at least on a similarity of the second and third similarity maps; and generating the weighted stack by:
applying the first weighting function to the first 4D image and
applying the second weighting function to the second 4D image.

13. The system of claim 10, wherein the computer system is configured to calculate the third similarity map by applying one of the following functions to the first and second 4D images:

semblance; and
cross-correlation.

14. The system of claim 10, further comprising modifying the first similarity map in response to determining that a portion thereof is below a threshold level of similarity.

15. The system of claim 10, wherein the second 3D image is derived from going wavefields, and the third 3D image is derived from down-going wavefields.

16. A non-transitory computer-readable medium containing instructions operable, when executed by a processor, to:

calculate a first similarity map, $S_1$, based at least on a similarity of one, $I_1$, of one or more first 3D images and a second 3D image, $I_2$, wherein the one or more first 3D images are derived from a first survey recorded during a first time period, and the second 3D image is derived from a second survey recorded during a second time period;

calculate a second similarity map, $S_2$, based at least on a similarity of the one of the one or more first 3D images and a third 3D image, $I_3$, wherein the third 3D image is derived from the second survey;

calculate a third similarity map, $S_D$, based at least on a similarity of first, $D_1$, and second, $D_2$, 4D images, wherein the first 4D image is based on a difference between the one of the one or more first 3D images and the second 3D image, and the second 4D image is based on a difference between the one of the one or more first 3D images and the third 3D image; and generate a composite 4D image based at least on the first, second, and third similarity maps, wherein any similarity represents how much respective images are alike.

17. The medium of claim 16, wherein the composite 4D image is a weighted stack of at least the first and second 4D images.

18. The medium of claim 17, wherein the instructions are operable, when executed by the processor, to generate the composite 4D image by:

calculating a first weighting function, $S_{1D}$, based at least on a similarity of the first and third similarity maps;

calculating a second weighting function, $S_{2D}$, based at least on a similarity of the second and third similarity maps; and generating the weighted stack by:
applying the first weighting function to the first 4D image and
applying the second weighting function to the second 4D image.

19. The medium of claim 16, wherein the instructions are operable, when executed by the processor, to calculate the third similarity map by applying one of the following functions to the first and second 4D images:

semblance; and
cross-correlation.

20. The medium of claim 16, further comprising modifying the first similarity map in response to determining that a portion thereof is below a threshold level of similarity.

* * * * *